United States Patent
Marks

(10) Patent No.: US 7,113,193 B2
(45) Date of Patent: Sep. 26, 2006

(54) METHOD FOR COLOR TRANSITION DETECTION

(75) Inventor: Richard L. Marks, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 10/927,918

(22) Filed: Aug. 26, 2004

(65) Prior Publication Data

US 2005/0024379 A1 Feb. 3, 2005

Related U.S. Application Data

(62) Division of application No. 09/261,578, filed on Jul. 21, 2000, now Pat. No. 6,795,068.

(51) Int. Cl.
*G09G 5/02* (2006.01)

(52) U.S. Cl. .................. 345/589; 345/591; 345/593

(58) Field of Classification Search ............... 345/589, 345/591, 593, 597, 604; 382/164, 165
See application file for complete search history.

(56) References Cited

U.S. PATENT DOCUMENTS

| | | |
|---|---|---|
| 3,943,277 A | 3/1976 | Everly et al. |
| 4,051,520 A * | 9/1977 | Davidse et al. ............. 348/592 |
| 4,133,004 A | 1/1979 | Fitts |
| 4,448,200 A | 5/1984 | Brooks et al. |
| 4,533,937 A * | 8/1985 | Yamamoto et al. ......... 348/592 |
| 4,649,504 A | 3/1987 | Krouglicof et al. |
| 4,672,564 A | 6/1987 | Egli et al. |
| 4,675,562 A | 6/1987 | Herlein et al. |
| 4,685,054 A | 8/1987 | Manninen et al. |
| 4,685,146 A | 8/1987 | Fenster et al. |
| 4,843,568 A | 6/1989 | Krueger et al. |
| 4,864,515 A | 9/1989 | Deck |
| 4,933,864 A | 6/1990 | Evans, Jr. et al. |

(Continued)

FOREIGN PATENT DOCUMENTS

JP 59-002040 U 1/1984

(Continued)

OTHER PUBLICATIONS

Ware te al., "Reaching for Objects in VR: Displays: Lag and Frame Rate," ACM Transactions on Computer-Human Interaction, vol. 1, No. 4, Dec. 1994.

(Continued)

*Primary Examiner*—Ulka Chauhan
*Assistant Examiner*—Roberta Prendergast
(74) *Attorney, Agent, or Firm*—Carr & Ferrell LLP

(57) ABSTRACT

A hand-manipulated prop is picked-up via a single video camera, and the camera image is analyzed to isolate the part of the image pertaining to the object for mapping the position and orientation of the object into a three-dimensional space, wherein the three-dimensional description of the object is stored in memory and used for controlling action in a game program, such as rendering of a corresponding virtual object in a scene of a video display. Algorithms for deriving the three-dimensional descriptions for various props employ geometry processing, including area statistics, edge detection and/or color transition localization, to find the position and orientation of the prop from two-dimensional pixel data. Criteria are proposed for the selection of colors of stripes on the props which maximize separation in the two-dimensional chrominance color space, so that instead of detecting absolute colors, significant color transitions are detected. Thus, the need for calibration of the system dependent on lighting conditions which tend to affect apparent colors can be avoided.

20 Claims, 8 Drawing Sheets

U.S. PATENT DOCUMENTS

| | | | |
|---|---|---|---|
| 4,942,538 A | 7/1990 | Yuan et al. | |
| 4,956,794 A | 9/1990 | Zeevi et al. | |
| 4,962,540 A * | 10/1990 | Tsujiuchi et al. | 382/165 |
| 5,034,986 A | 7/1991 | Karmann et al. | |
| 5,045,843 A | 9/1991 | Hansen | |
| 5,067,014 A | 11/1991 | Bergen et al. | |
| 5,128,671 A | 7/1992 | Thomas, Jr. | |
| 5,128,794 A | 7/1992 | Mocker et al. | |
| 5,162,781 A | 11/1992 | Cambridge | |
| 5,194,941 A * | 3/1993 | Grimaldi et al. | 348/587 |
| 5,208,763 A | 5/1993 | Hong et al. | |
| 5,212,888 A | 5/1993 | Cary et al. | |
| 5,227,985 A | 7/1993 | DeMenthon | |
| 5,230,623 A | 7/1993 | Guthrie et al. | |
| 5,297,061 A | 3/1994 | Dementhon et al. | |
| 5,307,137 A * | 4/1994 | Jones et al. | 356/4.01 |
| 5,335,557 A | 8/1994 | Yasutake | |
| 5,361,147 A * | 11/1994 | Katayama et al. | 358/532 |
| 5,363,120 A | 11/1994 | Drumm | |
| 5,446,798 A | 8/1995 | Morita et al. | |
| 5,450,504 A | 9/1995 | Calia | |
| 5,469,193 A | 11/1995 | Giobbi et al. | |
| 5,473,736 A * | 12/1995 | Young | 345/593 |
| 5,534,917 A | 7/1996 | MacDougall | |
| 5,548,667 A | 8/1996 | Tu | |
| 5,557,684 A | 9/1996 | Wang et al. | |
| 5,577,179 A * | 11/1996 | Blank | 345/639 |
| 5,586,231 A | 12/1996 | Florent et al. | |
| 5,611,000 A | 3/1997 | Szeliski et al. | |
| 5,616,078 A | 4/1997 | Oh | |
| 5,630,033 A * | 5/1997 | Purcell et al. | 345/418 |
| 5,631,697 A * | 5/1997 | Nishimura et al. | 348/172 |
| 5,647,019 A | 7/1997 | Iino et al. | |
| 5,649,032 A | 7/1997 | Burt et al. | |
| 5,668,646 A * | 9/1997 | Katayama et al. | 358/530 |
| 5,672,820 A | 9/1997 | Rossi et al. | |
| 5,680,487 A | 10/1997 | Markandey | |
| 5,684,887 A * | 11/1997 | Lee et al. | 382/107 |
| 5,757,360 A | 5/1998 | Nitta et al. | |
| 5,764,803 A * | 6/1998 | Jacquin et al. | 382/236 |
| 5,805,170 A | 9/1998 | Burch | |
| 5,805,745 A | 9/1998 | Graf | |
| 5,818,424 A | 10/1998 | Korth | |
| 5,825,308 A | 10/1998 | Rosenberg | |
| 5,856,844 A | 1/1999 | Batterman et al. | |
| 5,864,742 A * | 1/1999 | Gasper et al. | 399/366 |
| 5,880,856 A | 3/1999 | Ferriere | |
| 5,889,505 A | 3/1999 | Toyama et al. | |
| 5,903,318 A * | 5/1999 | Demay et al. | 348/592 |
| 5,905,894 A | 5/1999 | De Bonet | |
| 5,913,727 A | 6/1999 | Ahdoot | |
| 5,917,937 A | 6/1999 | Szeliski et al. | |
| 5,923,318 A | 7/1999 | Zhai et al. | |
| 5,923,381 A * | 7/1999 | Demay et al. | 348/592 |
| 5,929,860 A | 7/1999 | Hoppe | |
| 5,933,535 A | 8/1999 | Lee et al. | |
| 5,959,673 A | 9/1999 | Lee et al. | |
| 5,963,209 A | 10/1999 | Hoppe | |
| 5,966,133 A | 10/1999 | Hoppe | |
| 5,982,352 A | 11/1999 | Pryor | |
| 5,986,668 A | 11/1999 | Szeliski et al. | |
| 5,987,164 A | 11/1999 | Szeliski et al. | |
| 5,990,901 A | 11/1999 | Lawton et al. | |
| 6,009,188 A | 12/1999 | Cohen et al. | |
| 6,009,190 A | 12/1999 | Szeliski et al. | |
| 6,018,349 A | 1/2000 | Szeliski et al. | |
| 6,023,523 A | 2/2000 | Cohen et al. | |
| 6,026,182 A | 2/2000 | Lee et al. | |
| 6,031,934 A | 2/2000 | Ahmad et al. | |
| 6,035,067 A * | 3/2000 | Ponticos | 382/226 |
| 6,044,181 A | 3/2000 | Szeliski et al. | |
| 6,046,744 A | 4/2000 | Hoppe | |
| 6,049,619 A | 4/2000 | Anandan et al. | |
| 6,049,636 A | 4/2000 | Yang | |
| 6,072,494 A | 6/2000 | Nguyen | |
| 6,072,504 A | 6/2000 | Segen | |
| 6,101,289 A | 8/2000 | Kellner | |
| 6,121,953 A | 9/2000 | Walker | |
| 6,162,123 A | 12/2000 | Woolston | |
| 6,172,354 B1 | 1/2001 | Adan et al. | |
| 6,201,581 B1 * | 3/2001 | Moriwake et al. | 348/587 |
| 6,356,272 B1 * | 3/2002 | Matsumoto et al. | 345/582 |
| 6,417,836 B1 | 7/2002 | Kumar et al. | |
| 6,496,598 B1 * | 12/2002 | Harman | 382/154 |
| 6,545,663 B1 | 4/2003 | Arbter et al. | |
| 6,563,499 B1 * | 5/2003 | Waupotitsch et al. | 345/420 |
| 6,594,388 B1 * | 7/2003 | Gindele et al. | 382/167 |
| 6,720,949 B1 | 4/2004 | Pryor et al. | |
| 6,771,813 B1 * | 8/2004 | Katsuyama | 382/165 |
| 6,795,068 B1 | 9/2004 | Marks | |
| 6,807,296 B1 * | 10/2004 | Mishima | 382/162 |
| 6,917,692 B1 | 7/2005 | Murching et al. | |

FOREIGN PATENT DOCUMENTS

| | | |
|---|---|---|
| JP | 61-131110 A | 6/1986 |
| JP | 7-160412 A | 6/1995 |
| JP | 3244798 | 1/2001 |

OTHER PUBLICATIONS

Balakrishnan et al., "Performance Differences in the Fingers, Wrist, and Forearm in Computer Input Control," Proc. of 1997 ACM Conf. on Human Factors in Computing Systems.

Balakrishnan et al., "The PadMouse: Facilitating Selection and Spatial Positioning for the Non-Dominant Hand," Proc. of 1998 ACM Conf. on Human Factors in Computing Systems.

Segen et al., "Gesture VR: Vision Based 3D Hand Interface for Spatial Interaction," Proceedings of Sixth ACM International Conference on Multimedia, 1998.

Balakrishnan et al., "Exploring Interactive Curve and Surface Manipulation Using a Bend and Twist Sensitive Input Strtip," Proc. of 1999 ACM Symp. on Interactive 3D Graphics.

Balakrishnan et al., "Exploring Bimanual Camera Control and Object Manipulation in 3D Graphics Interfaces," Proc. of 1999 ACM Conf. on Human Factors in Computing Systems.

Fitzmaurice et al., "Sampling, Synthesis, and Input Devices," Communications of the ACM, vol. 42, No. 8, Aug. 1999.

* cited by examiner

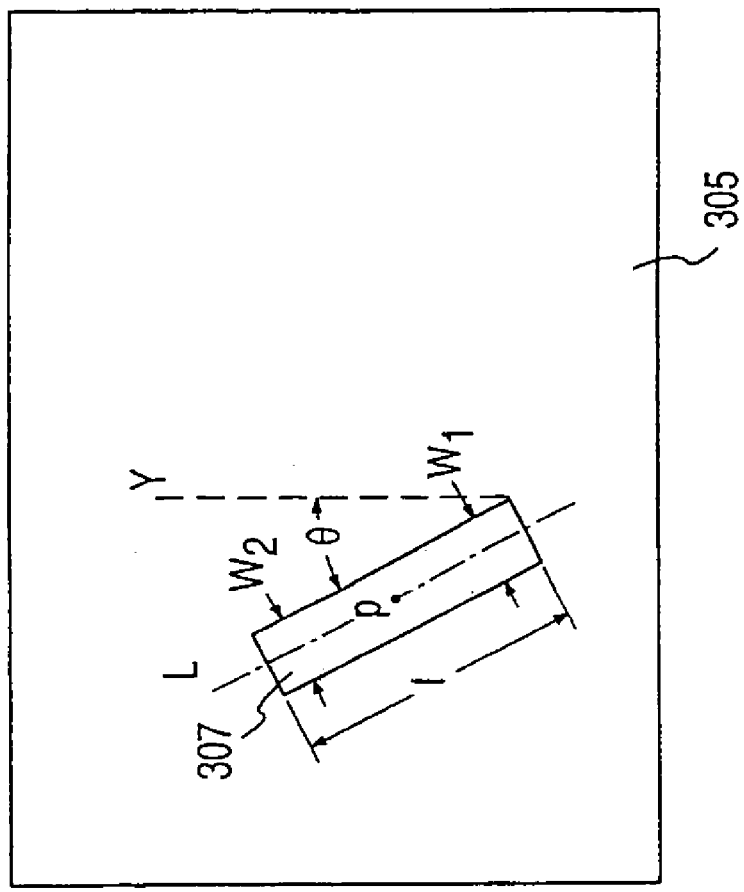
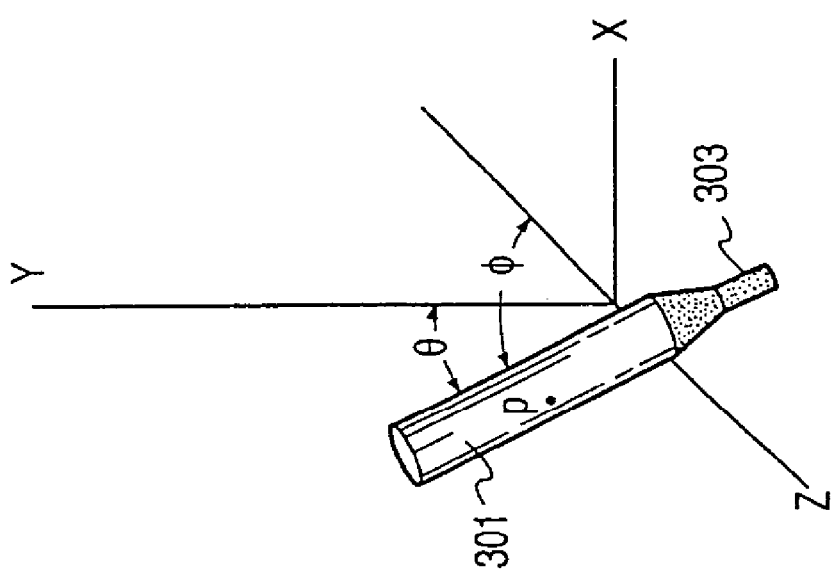
FIG.4B
FIG.4A

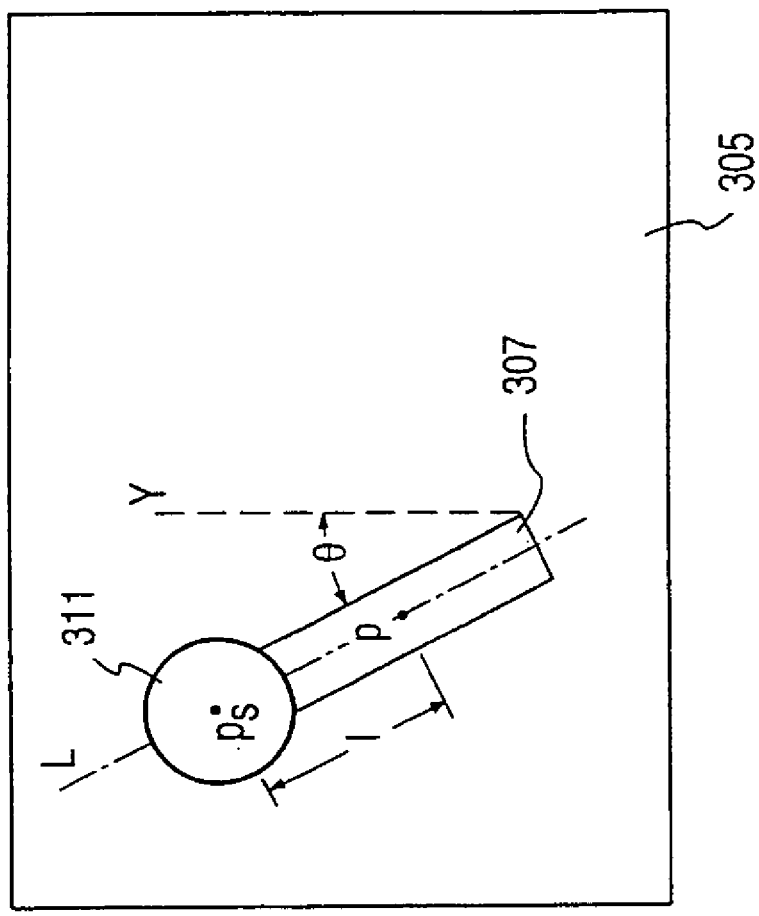
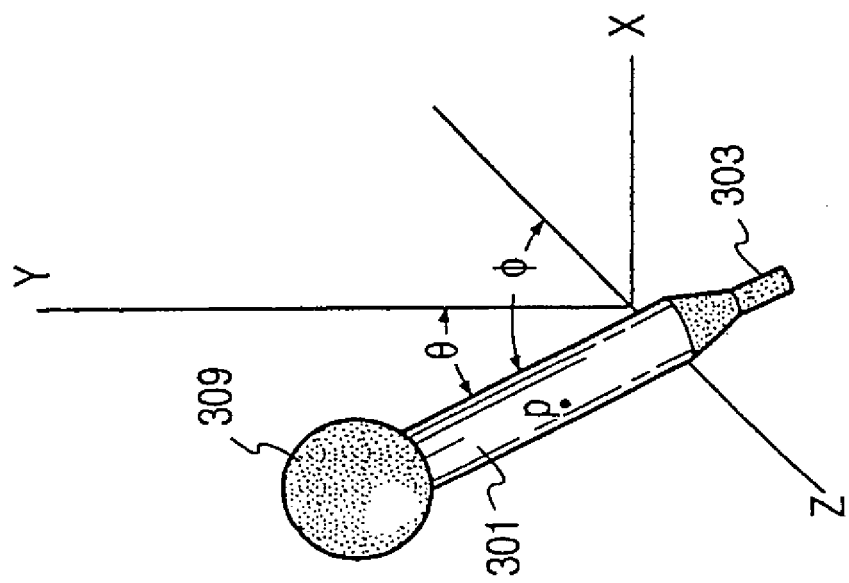
FIG.5B
FIG.5A ously to an object of interest. For example, although move-

METHOD FOR COLOR TRANSITION DETECTION

CROSS REFERENCE TO RELATED APPLICATION

This application is a divisional application of and claims the priority benefit of U.S. patent application Ser. No. 09/621,578 entitled "Method for Mapping an Object from a Two-Dimensional Camera Image to a Three-Dimensional Space for Controlling Action in a Game Program" filed Jul. 21, 2000 and now U.S. Pat. No. 6,795,068. The disclosure of this commonly owned and assigned application is incorporated herein by reference.

BACKGROUND OF THE INVENTION

1. Field of the Invention

The present invention relates to computer vision systems, and more particularly to a system in which an object is picked-up via an individual video camera, the camera image is analyzed to isolate the part of the image pertaining to the object, and the position and orientation of the object is mapped into a three-dimensional space. A three-dimensional description of the object is stored in memory and used for controlling action in a game program, such as rendering of a corresponding virtual object in a scene of a video display.

2. Background of the Invention

Tracking of moving objects using digital video cameras and processing the video images for producing various displays has been known in the art. One such application, for producing an animated video version of a sporting event, has been disclosed by Segen, U.S. Pat. No. 6,072,504, the disclosure of which is incorporated in the present specification by reference. According to this system, the position of a tennis ball during play is tracked using a plurality of video cameras, and a set of equations relating the three-dimensional points in the court to two-dimensional points (i.e. pixels) of digital images within the field of view of the cameras are employed. Pixel positions of the ball resolved in a given digital image can be related to a specific three-dimensional position of the ball in play and, using triangulation from respective video images, a series of image frames are analyzed by a least-squares method, to fit the positions of the ball to trajectory equations describing unimpeded segments of motion of the ball.

As described in some detail by Segen, once a three-dimensional description of position and motion of an object has been determined, various methods exist which are well known in the art for producing an animated representation thereof using a program which animates appropriate object movement in a video game environment.

Stated otherwise, Segen is concerned with determining the three-dimensional position of an object in motion from a plurality of two-dimensional video images captured at a point in time. Once the three-dimensional position of the "real" object is known, it is then possible to use this information to control a game program in any number of different ways which are generally known to game programmers.

However, the system of Segen relies on a plurality of video cameras for developing positional information about the object based on triangulation. Moreover, the detected object of Segen is a simple sphere which does not require information about the orientation (e.g. inclination) of the object in space. Thus, the system of Segen is not capable of reconstructing position and orientation of an object, whether moving or at rest, from a two-dimensional video image using a single video camera.

It is common for game programs to have virtual objects formed from a combination of three-dimensional geometric shapes, wherein during running of a game program, three-dimensional descriptions (positions and orientations) of the objects relative to each other are determined by control input parameters entered using an input device such as a joystick, game controller or other input device. The three-dimensional position and orientation of the virtual objects are then projected into a two-dimensional display (with background, lighting and shading, texture, and so forth) to create a three-dimensional perspective scene or rendition by means of the rendering processor functions of the game console.

As an example, there can be "virtual object" that forms a moving image in a game display corresponding to how one moves around the "real" object. To display the virtual object, the calculated three-dimensional information is used for fixing the position and orientation of the "virtual object" in a memory space of the game console, and then rendering of the image is performed by known projection processing to convert the three-dimensional information into a realistic perspective display.

However, in spite of the above knowledge and techniques, problems continue to hinder successful object tracking, and a particularly difficult problem is extracting precisely only those pixels of a video image which correspond unambiguously to an object of interest. For example, although movement of an object having one color against a solid background of another color, where the object and background colors vary distinctly from one another, can be accomplished with relative ease, tracking of objects, even if brightly colored, is not so easy in the case of multi-colored or non-static backgrounds. Changes in lighting also dramatically affect the apparent color of the object as seen by the video camera, and thus object tracking methods which rely on detecting a particular colored object are highly susceptible to error or require constant re-calibration as lighting conditions change. The typical home use environment for video game programs demands much greater flexibility and robustness than possible with conventional object tracking computer vision systems.

SUMMARY OF THE INVENTION

It is a principle object of the present invention to provide an object tracking system suitable for video game programs which overcomes the aforementioned disadvantages of the conventional art, enabling tracking of the position and orientation of an object or prop which serves as an input device for affecting action in the game program.

Another object of the invention is to provide alternative interfaces for games, wherein rather than using a conventional joystick, the user can stand in front of a video camera connected to the game console device, and by physically moving or manipulating an object within view of a single camera, cause a corresponding action to occur in the game.

Yet another object of the invention is to provide methods for mapping two-dimensional information of a discriminated pixel group belonging to the manipulated object to a three-dimensional space, to provide a three-dimensional description of the position and orientation of the object in three dimensions from a single video camera image.

Yet a further object of the invention is to provide a three-dimensional description of an object which includes a rotational component of the manipulated object.

A still further object of the invention is to provide techniques for the selection of object colors which maximizes one's ability to discriminate, on the basis of color transitions, the pixel groups from a video image which belong unambiguously to the manipulated object and which provide the needed information for deriving a description of three-dimensional position and orientation of the object.

The above and other objects, features and advantages of the present invention will become apparent from the following description when taken in conjunction with the accompanying drawings in which preferred embodiments of the present invention are shown by way of illustrative example.

BRIEF DESCRIPTION OF THE DRAWINGS

FIG. 4A illustrates a prop device according to one aspect of the present invention;

FIG. 4B illustrates a process for mapping two-dimensional pixel data of a cylinder corresponding to the prop device shown in FIG. 4A to a three-dimensional space;

FIG. 5A illustrates a prop device according to another aspect of the present invention;

FIG. 5B illustrates a process for mapping two-dimensional pixel data of a combined sphere and cylinder corresponding to the prop device shown in FIG. 5A to a three-dimensional space.

DETAILED DESCRIPTION OF THE PREFERRED EMBODIMENTS

Figure 1:
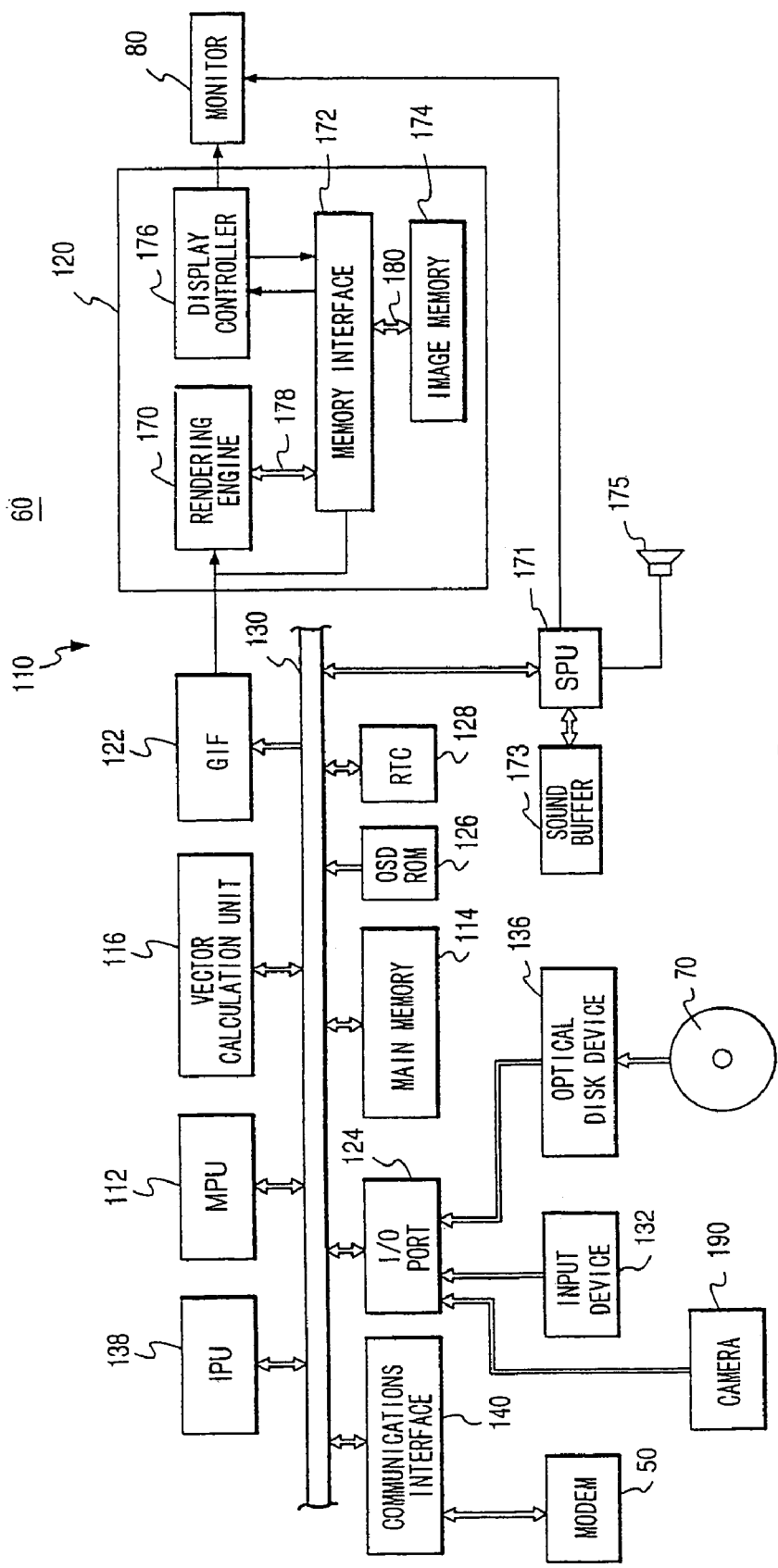
FIG. 1 is a block diagram showing an example of a configuration of a main part of a video game console which is adapted to receive an input from a digital video camera.

FIG. 1 is a block diagram of a configuration of a main part of a video game console 60 adapted for use with a manipulated object (prop) serving as an alternative input device.

The game console 60 constitutes a component of an overall entertainment system 110 according to the present invention which, as shown in FIG. 1 is equipped by a multiprocessor unit MPU 112 for control of the overall system 110, a main memory 114 which is used for various program operations and for storage of data, a vector calculation unit 116 for performing floating point vector calculations necessary for geometry processing, an image processor 120 for generating data based on controls from the MPU 112, and for outputting video signals to a monitor 80 (for example a CRT), a graphics interface (GIF) 122 for carrying out mediation and the like over a transmission bus between the MPU 112 or vector calculation unit 116 and the image processor 120, an input/output port 124 for facilitating reception and transmission of data to and from peripheral devices, an internal OSD functional ROM (OSDROM) 126 constituted by, for example, a flash memory, for performing control of a kernel or the like, and a real time clock 128 having calendar and timer functions.

The main memory 114, vector calculation unit 116, GIF 122 OSDROM 126, real time clock 128, and input/output port 124 are connected to the MPU 112 over a data BUS 130.

Further connected to the BUS 130 is an image processing unit 138 which is a processor for expanding compressed moving images and texture images, thereby developing the image data. For example, the image processing unit 138 can serve functions for decoding and development of bit streams according to the MPEG2 standard format, macroblock decoding, performing inverse discrete cosine transformations, color space conversion, vector quantization and the like.

A sound system is constituted by a sound processing unit SPU 171 for generating musical or other sound effects on the basis of instructions from the MPU 112, a sound buffer 173 into which waveform data may be recorded by the SPU 171, and a speaker 175 for outputting the musical or other sound effects generated by the SPU 171. It should be understood that the speaker 175 may be incorporated as part of the display device 80 or may be provided as a separate audio line-out connection attached to an external speaker 175.

A communications interface 140 is also provided, connected to the BUS 130, which is an interface having functions of input/output of digital data, and for input of digital contents according to the present invention. For example, through the communications interface 140, user input data may be transmitted to, and status data received from, a server terminal on a network. A modem 50 may be coupled to the communications interface 140. An input device 132 (also known as a controller) for input of data (e.g. key input data or coordinate data) with respect to the entertainment system 110, an optical disk device 136 for reproduction of the contents of an optical disk 70, for example a CD-ROM or the like on which various programs and data (i.e. data concerning objects, texture data and the like), are connected to the input/output port 124.

As a further extension or alternative to the input device, the present invention includes a digital video camera 190 which is connected to the input/output port 124. The input/output port 124 may be embodied by one or more input interfaces, including serial and USB interfaces, wherein the digital video camera 190 may advantageously make use of the USB input or any other conventional interface appropriate for use with the camera 190.

The above-mentioned image processor 120 includes a rendering engine 170, a memory interface 172, an image memory 174 and a display control device 176 (e.g. a programmable CRT controller, or the like).

The rendering engine 170 executes operations for rendering of predetermined image data in the image memory, through the memory interface 172, and in correspondence with rendering commands which are supplied from the MPU 112.

A first BUS 178 is connected between the memory interface 172 and the rendering engine 170, and a second BUS 180 is connected between the memory interface 172 and the image memory 174. First BUS 178 and second BUS 180, respectively, have a bit width of, for example 128 bits, and the rendering engine 170 is capable of executing high speed rendering processing with respect to the image memory 174.

The rendering engine 170 has the capability of rendering, in real time, image data of 320×240 pixels or 640×480 pixels, conforming to, for example, NTSC or PAL standards, and more specifically, at a rate greater than ten to several tens of times per interval of from 1/60 to 1/30 of a second.

The image memory 174 employs a unified memory structure in which, for example, a texture rendering region and a display rendering region, can be set in a uniform area.

The display controller 176 is structured so as to write the texture data which has been retrieved from the optical disk 70 through the optical disk device 136, or texture data which has been created on the main memory 114, to the texture rendering region of the image memory 174, via the memory interface 172, and then to read out, via the memory interface 172, image data which has been rendered in the display rendering region of the image memory 174, outputting the same to the monitor 80 whereby it is displayed on a screen thereof.

There shall now be described, with reference to FIG. 2, an overall system configuration by which a user holding a prop object manipulates the object in front of a digital video camera, for causing an action to occur in a video game.

Figure 2:
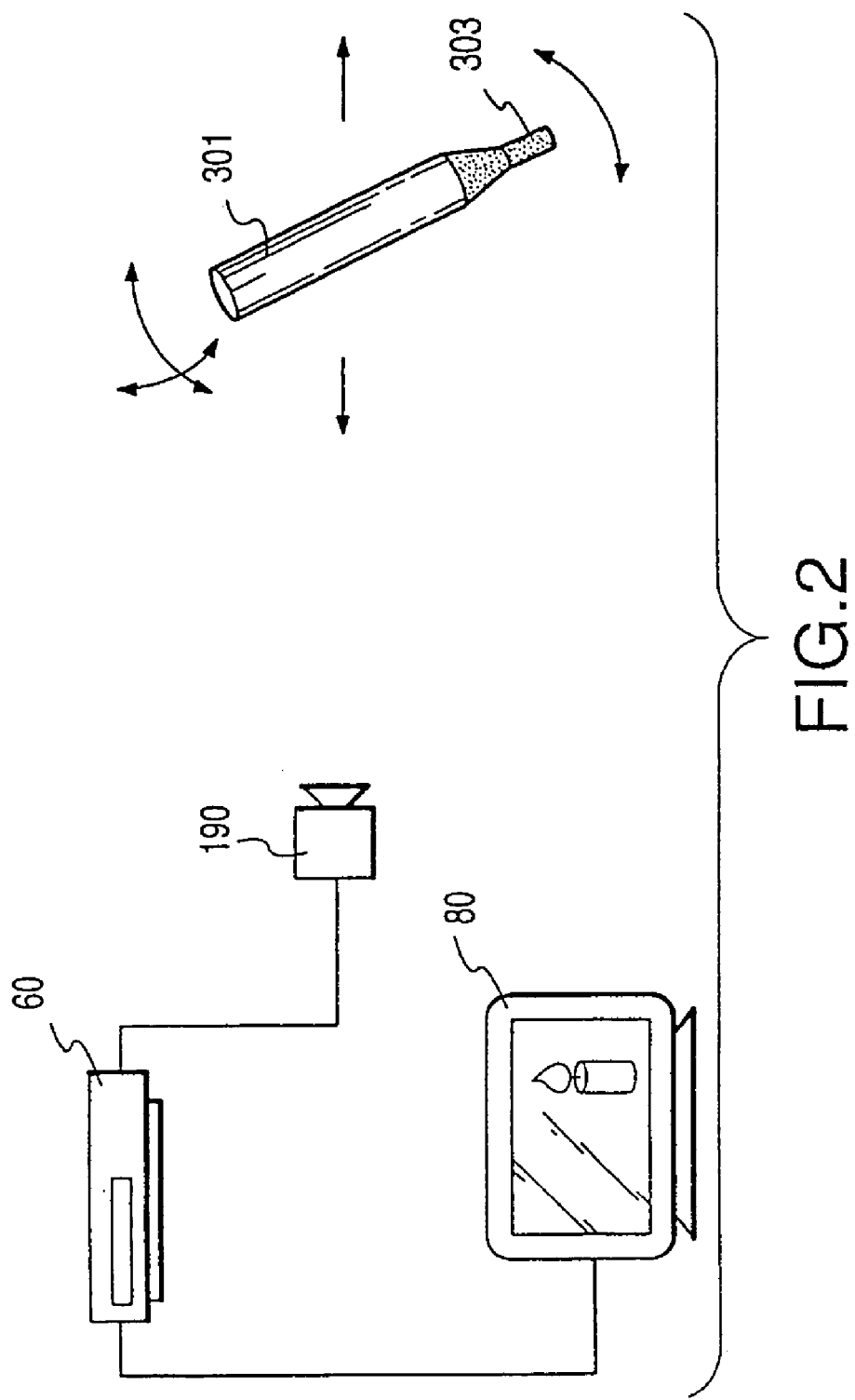
FIG. 2 is an illustration showing movement of a hand held prop, as an auxiliary input device, in front of a digital camera for causing corresponding action on a video display of a game program.

As shown in FIG. 2, the prop may comprise a stick-like object which is made up of a handle 303 which is typically black in color, and a brightly colored cylinder (i.e. having a saturated color) 301. A user stands in front of the video camera 190, which may comprise a USB webcam or a digital camcorder connected to an input/output port 124 of a game console 60 such as the "Playstation 2" ® manufactured by Sony Computer Entertainment Inc. As the user moves the object in front of the camera 190, the features of the object relating to the cylinder are picked up by the camera 190, and processing (to be described later) is performed in order to isolate and discriminate a pixel group corresponding only to the cylinder. A three-dimensional description of the cylinder, including its position and orientation in three-dimensional space, is calculated, and this description is correspondingly stored in the main memory 114 of the game console 60. Then, using rendering techniques known in the art, the three-dimensional description of the object is used to cause action in a game program which is displayed on the display screen of the monitor 80. For example, a virtual object, shown as a torch for example, can be moved throughout the scene of the game, corresponding to the movements of the real object made by the user. As the user changes the position and orientation of the object by moving it, the three-dimensional description of the object in the memory 114, and a corresponding rendering of the object in the rendering area of image memory 174, are continuously updated so that the position and orientation of the virtual object, or torch, on the monitor 80 changes as well.

As noted above, the essential information which must be provided is a three-dimensional description of the object, which in the case of FIG. 2 is a cylinder. However, the image which is picked up by the camera provides only two-dimensional pixel information about the object. Moreover, it is necessary to discriminate the pixels which relate only the object itself before a three-dimensional description thereof can be calculated.

Figure 3:
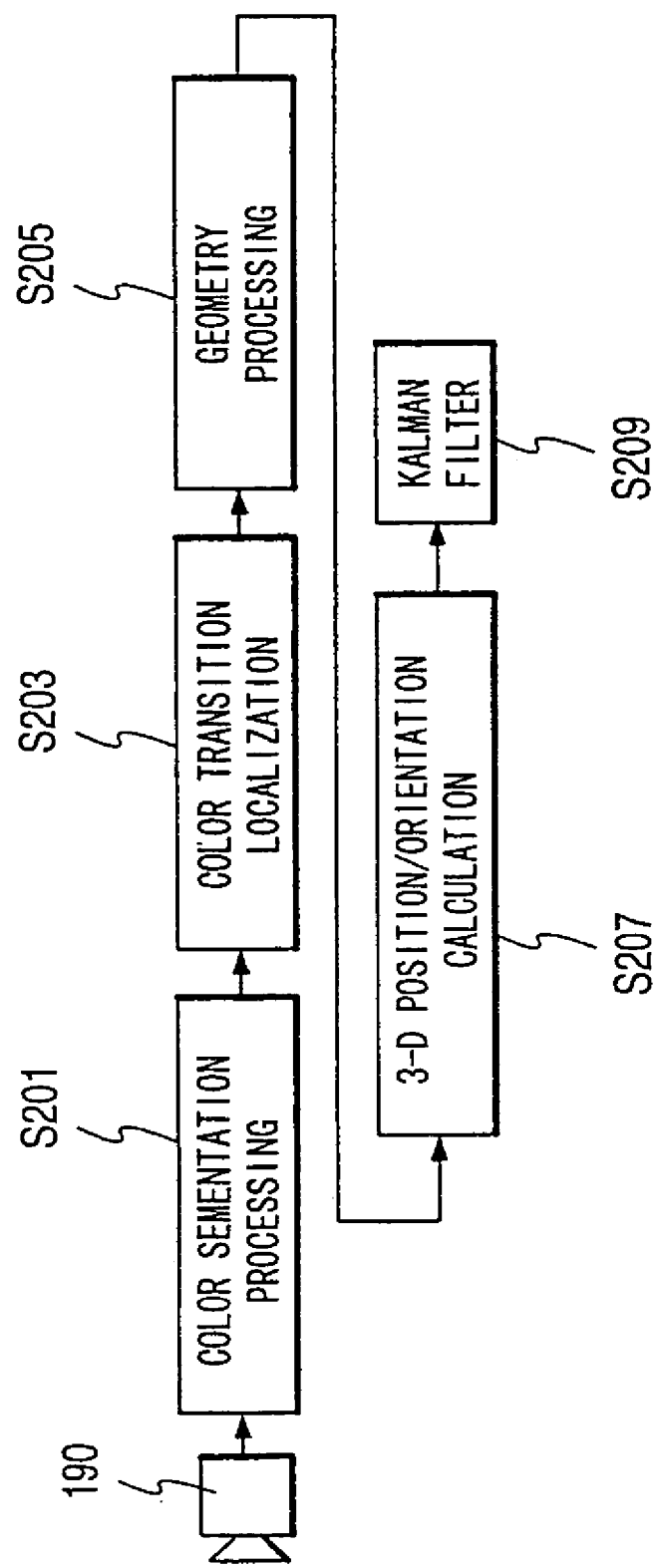
FIG. 3 is a block diagram showing the functional blocks required for tracking and discrimination of the prop as it is manipulated by the user.

FIG. 3 is a block diagram showing the functional blocks used to track and discriminate a pixel group corresponding to the prop as it is being manipulated by the user. It shall be understood that the functions depicted by the blocks are implemented by software which is executed by the MPU 112 in the game console 60. Moreover, not all of the functions indicted by the blocks in FIG. 3 are used for each embodiment. In particular, color transition localization is used only in the embodiment described in relation to FIGS. 6A and 6B, which shall be discussed below.

Initially the pixel data input from the camera is supplied to the game console 60 through the input/output port interface 124, enabling the following processes to be performed thereon. First, as each pixel of the image is sampled, for example, on a raster basis, a color segmentation processing step S201 is performed, whereby the color of each pixel is determined and the image is divided into various two-dimensional segments of different colors. Next, for certain embodiments, a color transition localization step S203 is performed, whereby regions where segments of different colors adjoin are more specifically determined, thereby defining the locations of the image in which distinct color transitions occur. Then, a step for geometry processing S205 is performed which, depending on the embodiment, comprises either an edge detection process or performing calculations for area statistics, to thereby define in algebraic or geometric terms the lines, curves and/or polygons corresponding to the edges of the object of interest. For example, in the case of the cylinder shown in FIG. 2 the pixel area will comprise a generally rectangular shape corresponding to an orthogonal frontal view of the cylinder. From the algebraic or geometric description of the rectangle, it is possible to define the center, width, length and two-dimensional orientation of the pixel group corresponding only to the object.

The three-dimensional position and orientation of the object are calculated in step S207, according to algorithms which are to be described in association with the subsequent descriptions of preferred embodiments of the present invention.

Lastly, the data of three-dimensional position and orientation also undergoes a processing step S209 for Kalman filtering to improve performance. Such processing is performed to estimate where the object is going to be at a point in time, and to reject spurious measurements that could not be possible, and therefore are considered to lie outside the true data set. Another reason for Kalman filtering is that the camera 190 produces images at 30 Hz, whereas the typical display runs at 60 Hz, so Kalman filtering fills the gaps in the data used for controlling action in the game program. Smoothing of discrete data via Kalman filtering is well known in the field of computer vision and hence will not be elaborated on further.

In FIG. 4A, a prop which is used according to the first embodiment shall be described, and in FIG. 4B a description is given which explains how three-dimensional information of the position and orientation of the prop of FIG. 4A is derived from a two-dimensional video image thereof.

As shown in FIG. 4A, the prop is a cylindrical body 301 having a single solid color attached to a handle 303 which is preferably black in color. In order to fully define the position and orientation of the object in a three-dimensional space, a position of a given point p, typically the center of the object, in the X-Y plane and a depth quantity Z (i.e. the position of the point p on the Z axis) must be determined, together with angular information of the object in at least two different planes, for example, an inclination θ of the object in the X-Y plane, and an inclination φ of the object in the Y-Z plane. The actual physical length and diameter of the cylinder 301, together with knowledge of the focal length of the camera, may be used for scaling, but are not essential for programming action in a game program since the virtual object shown on the display need not be of the same length and diameter, or even of the same shape, as the prop.

Referring now to FIG. 4B, this figure shows a two-dimensional pixel image 305 of the object produced by the video camera 190. A frontal orthogonal view of the cylindrical object 301 is picked up in the video image which appears as a generally rectangular pixel group 307, however, wherein the width of the pixel group can vary along the length l thereof as a result of the object being inclined in the phi φ direction or as a result of the distance overall of the prop from the camera. It will be understood that the inclination in the phi φ direction is not directly visible in the video image 305.

To determine the length, center point, etc. of the pixel group 307 in accordance with the geometry processing step S205 discussed above, known area statistics calculations are used. Area statistics include the area, centroid, moment about the X-axis, moment about the Y-axis, principal moments, and the angle of principal moments, which typically are used for calculating moments of inertia of objects about a certain axis. For example, to determine the moments about the X and Y axes, respectively, if each pixel making up the pixel group is considered to correspond to a particle of a given uniform mass m making up a thin homogeneous sheet or lamina, then the moments about x and y axes of a system of n such particles (or pixels) located in a coordinate plane are defined as follows:

$$M_x = \sum_{k=1}^{n} my_k \quad (1)$$

$$M_y = \sum_{k=1}^{n} mx_k \quad (2)$$

The center of mass of this system is located at the point (x, y) given by $$x = \frac{M_y}{m}, \quad y = \frac{M_x}{m} \quad (3)$$

Further, assuming the lamina is of a shape having a geometric center, such as the rectangle in the case of FIG. 4B or a circle in the case of FIG. 5B (to be discussed later), the center of mass of such a lamina corresponds to the geometric center. More generally, if one knows the area statistics of the pixel region and, for example, that the two-dimensional shape is a rectangle, one can directly calculate its width, height and orientation. Similar calculations are possible with circular shapes to determine the center point and radius, for example. Representative calculations for cases of rectangles and circles can be found in standard college-level calculus or physics texts.

Because the image 305 is already taken to be in the X-Y plane, the X-Y position of the center point p can be derived directly from the image. Also, the theta θ quantity is taken directly from the image simply by knowing any line l, determined in accordance with the geometry processing step S205 described above, which runs along the longitudinal axis of the pixel group 307 corresponding to the cylinder 301. Typically, a longitudinal line l passing through the center point p is used for this purpose.

Determination of the phi φ quantity requires some additional knowledge about the pixel width w in at least two different locations $w_1$ and $w_2$ wherein the ratio of the width quantities $w_1:w_2$ provides a value which can be used for determining φ. More specifically, if the cylinder 301 is inclined so that the top end thereof is closer to the camera 190 than the lower end of the cylinder, then, since the lower end of the cylinder is at a greater distance from the camera 190, the pixel width quantity $w_2$ of the image will have a greater value than the pixel width quantity $w_1$, and vice versa. The ratio $w_1:w_2$ is proportional to the inclination φ of the cylinder 301 in the Y-Z plane, and therefore the phi quantity φ can be determined from this ratio. Typically, for better accuracy, a plurality of equidistant measurements of pixel widths between ends of the pixel group 307 are taken, and averaging is performed to determine the ratio $w_1:w_2$.

Determination of the depth quantity Z can be done in different ways. However, it is important to recognize that the size and number of pixels making up the two-dimensional pixel group 307 are affected both by the inclination of the object in the φ direction as well as by the actual distance of the physical object from the video camera 190. More specifically, as the object inclines in the φ direction, the apparent length of the object as seen by the video camera tends to shorten, so that the length l of the pixel group shortens as well. However, at the same time, as the object moves farther away from the camera along the Z-axis, the apparent size of the object overall, including its length l, also becomes smaller. Therefore, it is insufficient simply to look at the length l alone as an indicator of how far away from the camera the object is. Stated otherwise, the depth quantity Z must be determined as a function of both l and φ.

However, if the phi quantity φ has already been determined and is known, a phi-weighted value of l, which we may call $l_φ$, can be determined, and the pixel length of $l_φ$ in the image, which changes as the object is moved closer or farther from the camera while assuming that φ stays constant, then can be used to determine the depth quantity Z since $l_φ$ will be proportional to Z.

Another method for determining depth Z is to count the total number of pixels in the pixel group 307 corresponding to the object. As the object gets closer to or farther from the camera, the number of pixels making up the pixel group 307 increases or decreases respectively, in proportion to the depth quantity Z. However, again, the number of pixels in the pixel group 307 is also affected by the inclination in the phi φ direction, so the number of pixels N must first be weighted by phi φ to result in a weighted quantity $N_φ$ which is used for determining the depth quantity Z based on a proportional relationship between $N_φ$ and Z.

Yet another advantageous method for determining the depth quantity Z is to use the average width $w_{avg}$ of the rectangle, which is calculated as the sum of a given number of width measurements of the rectangle divided by the number of width measurements taken. It should be clear that the average width of the pixel group is affected only by Z and not by the phi-inclination of the cylinder. It is also possible to determine phi φ from the ratio of the total length of the pixel group to the average width (i.e. $l:w_{avg}$), and moreover, wherein the sign of the phi-inclination can be determined based on whether $w_1$ is greater or less than $w_2$.

In FIG. 5A, a prop which is used according to another embodiment shall be described, and in FIG. 5B a description is given which explains how three-dimensional information of the position and orientation of the prop of FIG. 5A is derived from a two-dimensional video image thereof.

The prop according to the second embodiment, similar to the first embodiment shown in FIG. 4A, comprises a cylindrical stick-shaped object, however in this case, a spherical object 309 of a different color is rigidly affixed to one end of the cylinder 301. In addition, although not shown, a distal end of the cylinder may be provided which protrudes just slightly and is visible from an upper end of the sphere 309. As shall be explained below, the sphere 309 provides a simplified means for determining the depth quantity Z and the inclination of the object in the phi $\phi$ direction, which does not require measurement of relative widths of the cylinder 301, and which does not require any weighting of the length quantity by phi $\phi$ in order to determine the depth quantity Z.

As shown in FIG. 5B, a pixel group 311 corresponding to the sphere 309 in the image appears as a two-dimensional circle. According to this embodiment, a radius R and center point $p_s$ of the circle are determined according to area statistics calculations which have already been discussed above. In this case, further, the total number of pixels making up the pixel group 311 of the circle can be counted for giving a pixel area of the circle. It will be appreciated that the circular pixel area will increase as the spherical object 309 comes closer to the camera 190 and vice versa, and therefore, since the total number of pixels in the pixel group 311 making up the circle is proportional to the depth quantity Z, the value for Z can be determined thereby.

It should also be realized that, unlike the cylinder in the previous embodiment, the shape and size of the circular pixel group are not influenced as a result of the phi $\phi$ angle of inclination. More specifically, even if the object overall is tilted in the phi direction, the sphere 309 and the pixel group 311 will retain their general shape and, unlike the length of the cylinder 301, will not become foreshortened as a result of such tilting. Therefore, an advantage is obtained in that the total number of pixels of the pixel group making up the circle in the image can always be related proportionately to the depth quantity Z and, for determining Z, phi-weighting as in the previous embodiment is not required.

Determination of inclination of the object in the theta $\theta$ direction is done directly from the image, just as in the previous embodiment, by determining the angle theta $\theta$ between a center longitudinal line of the pixel group 307 corresponding to the cylinder 301 and the Y-axis.

Determining the angle of inclination in the phi $\phi$ direction is handled somewhat differently than the previous embodiment. More specifically, such a quantity can be determined by knowledge of the depth quantity Z, determined as described above, and by the length l between the center point of the circle 311 and the center point of the pixel group 307 which corresponds to the cylinder 301. For any known and fixed depth quantity Z, the length l (as viewed from the perspective of the camera) becomes shorter as the object is tilted in the phi $\phi$ direction. Therefore, if the Z quantity is known, it is possible to determine, simply from the length l, the degree of inclination in the phi $\phi$ direction, and it is not necessary to calculate a relative width quantity or ratio of widths, as in the embodiment shown by FIGS. 4A and 4B.

Figure 6A:
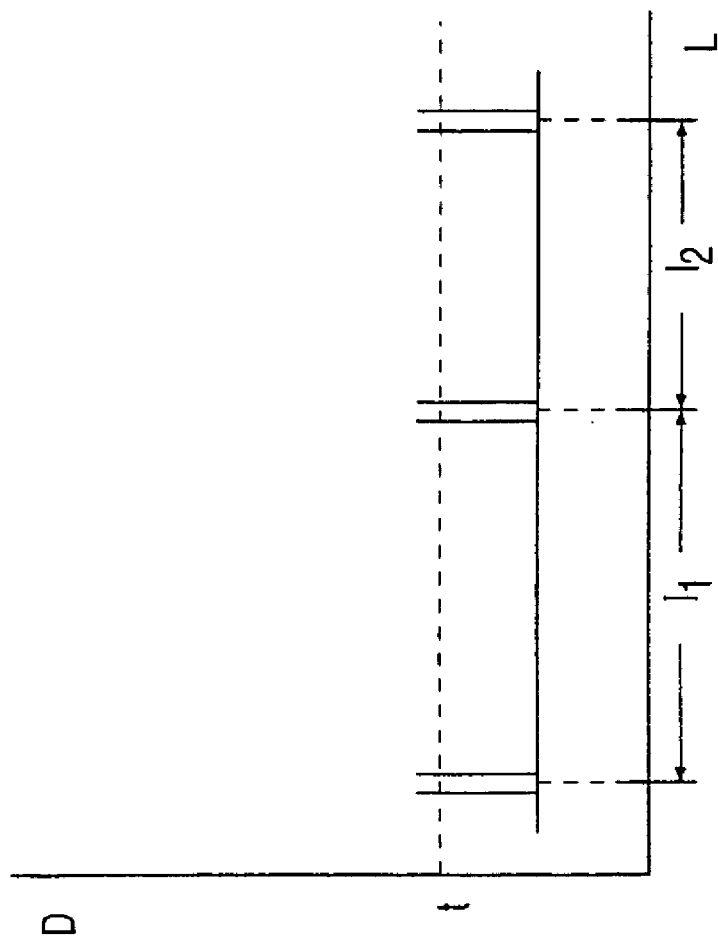
FIG. 6A illustrates a prop device according to still another aspect of the present invention.

FIG. 6A illustrates a prop device according to still another aspect of the present invention.

As in the embodiment shown in FIG. 6A, the prop itself comprises a generally cylindrical body 301. In addition, three stripes $S_1$, $S_2$ and $S_3$ having a different color than the cylinder itself are provided on the cylindrical body. Preferably, the stripes $S_1$, $S_2$ and $S_3$ are each equal in width and are spaced equidistant from each other, at either end of the cylinder 301 and in the center thereof.

According to this embodiment, a pixel group making up the cylinder is extracted from the image to provide a two-dimensional line along which to look for color transitions. To determine the quantities Z, $\theta$ and $\phi$, positions are determined at which color transitions along any line l in the longitudinal direction of the cylinder 301 occur.

Figure 6B:
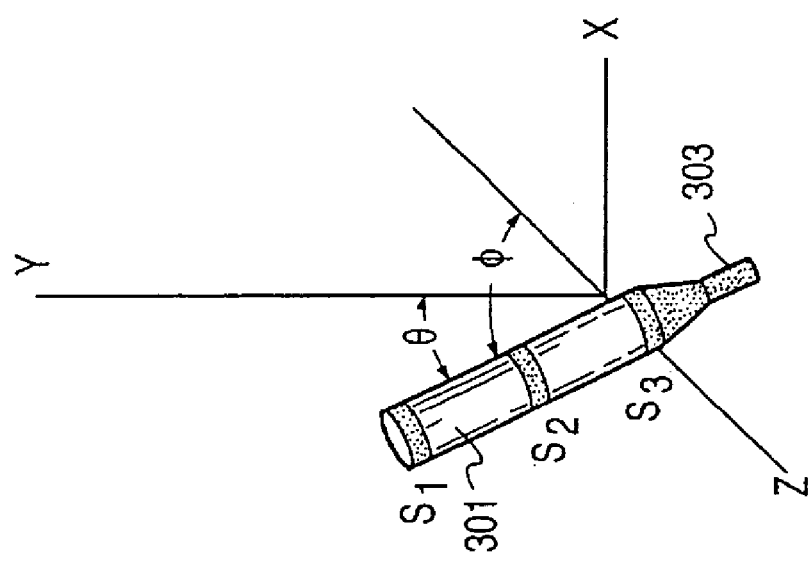
FIG. 6B illustrates a process for mapping two-dimensional pixel data of stripes provided on a cylinder corresponding to the prop device shown in FIG. 6A to a three-dimensional space on the basis of color transitions at the stripes.

More specifically, as shown in FIG. 6B, a group made up of only those pixels corresponding to a line l along the longitudinal direction of the cylinder body 301, as viewed by the camera, needs to be sampled in order to determine where along the line l distinct color transitions occur. In particular, for detecting such color transitions, the chrominance values Cr and Cb which are output as part of the YCrCb signals from the video camera 190 are detected. For reasons which shall be explained below in connection with the criteria for selecting the stripe colors, it is preferable to use a combined chrominance value D made up of a Pythagorean distance of the combined chrominance signals Cr and Cb for each color of the cylinder 301 and stripes $S_1$, $S_2$ and $S_3$, respectively, thereby defining a separation in the two-dimensional chrominance color space used by the video camera 190, according to the following formula (1):

$$D=\sqrt{(\Delta Cr)^2+(\Delta Cb)^2} \qquad (4)$$

By selecting colors which maximize the value of D (to be explained in more detail later), it is possible to select a threshold $D_t$ at which only color transitions above a certain separation where $D>D_t$ are considered to correspond to the color transitions of the stripes $S_1$, $S_2$ and $S_3$. Accordingly, the pixels along the line of the cylinder are filtered, using such a threshold, in order to find the large color transitions corresponding to the stripes $S_1$, $S_2$ and $S_3$.

As shown in FIG. 6B, at positions along the line l where color transitions occur, for each stripe two spikes corresponding to positions where color transitions appear can be detected, and the center point between these spikes is taken to be the position of the stripes. Once the positions of the stripes are fixed, it is then a matter of course to determine the lengths l1 and l2 between the stripes, wherein the overall length of the cylinder is determined by the sum of $l_1$ and $l_2$.

It shall next be explained how knowledge of $l_1$ and $l_2$ provides sufficient information for determining the quantities of Z, $\theta$ and $\phi$, necessary for describing the position and orientation of the object in three dimensions.

First, since the line l defined by the pixels running along the length of the cylinder has already been determined, and since the camera is assumed to face normally to the X-Y plane, the angle $\theta$ is taken directly as the angle between the longitudinal line of the cylinder and the Y axis, basically in the same manner as the preceding embodiments.

For determining the angle of inclination in the phi $\phi$ direction, the ratio of the lengths $l_1:l_2$ is used. For example, in the case (as shown) in which the cylinder is inclined in the $\phi$ direction toward the camera 190, with the upper end of the cylinder being closer to the camera than the lower end, the length $l_1$ will appear longer to the camera 190 (since it is closer) than the length $l_2$. It will also be appreciated that, although the apparent lengths $l_1$ and $l_2$ will also be affected by the overall distance Z of the object from the camera 190, the ratio of these lengths $l_1:l_2$ will not change and therefore this ratio provides a constant indication of the inclination of the cylinder 301 in the phi $\phi$ direction.

For determining the depth quantity Z, a procedure similar to that of the first embodiment is employed, wherein a phi-weighted quantity $l_\phi$ of the total length l ($l=l_1+l_2$) is determined for giving Z. More specifically, the influence of the inclination angle $\phi$ on the total apparent length l of the object is first determined, and then the total length, properly weighted by the influence of $\phi$, is proportional to the distance (or depth quantity) Z of the object from the camera 190.

Stated more simply, $\phi$ is determined from the ratio of $l_1$ and $l_2$, and once phi $\phi$ is known, the total depth quantity Z can be determined from the sum of $l_1$ and $l_2$.

There shall now be described, in connection with FIG. 7, a method for determining a rotational component of the prop. This method may be applied in conjunction with any of the embodiments which have discussed above, by further equipping the prop device with a helical stripe $S_H$ thereon.

Each of the tracking methods described above can be used to obtain five of the six degrees of freedom of the objects. The only one missing is the rotation of the cylinder about its axis. Information about the rotation of the cylinder would seem difficult to obtain because cylinders are symmetric in rotation about this axis. The approach taken by the present invention to obtain this rotational component is to add a helical stripe $S_H$ that goes around the cylinder 301 exactly once. As the cylinder 301 is rotated, the height of the stripe SH will correspond to the rotation angle.

Figure 7:
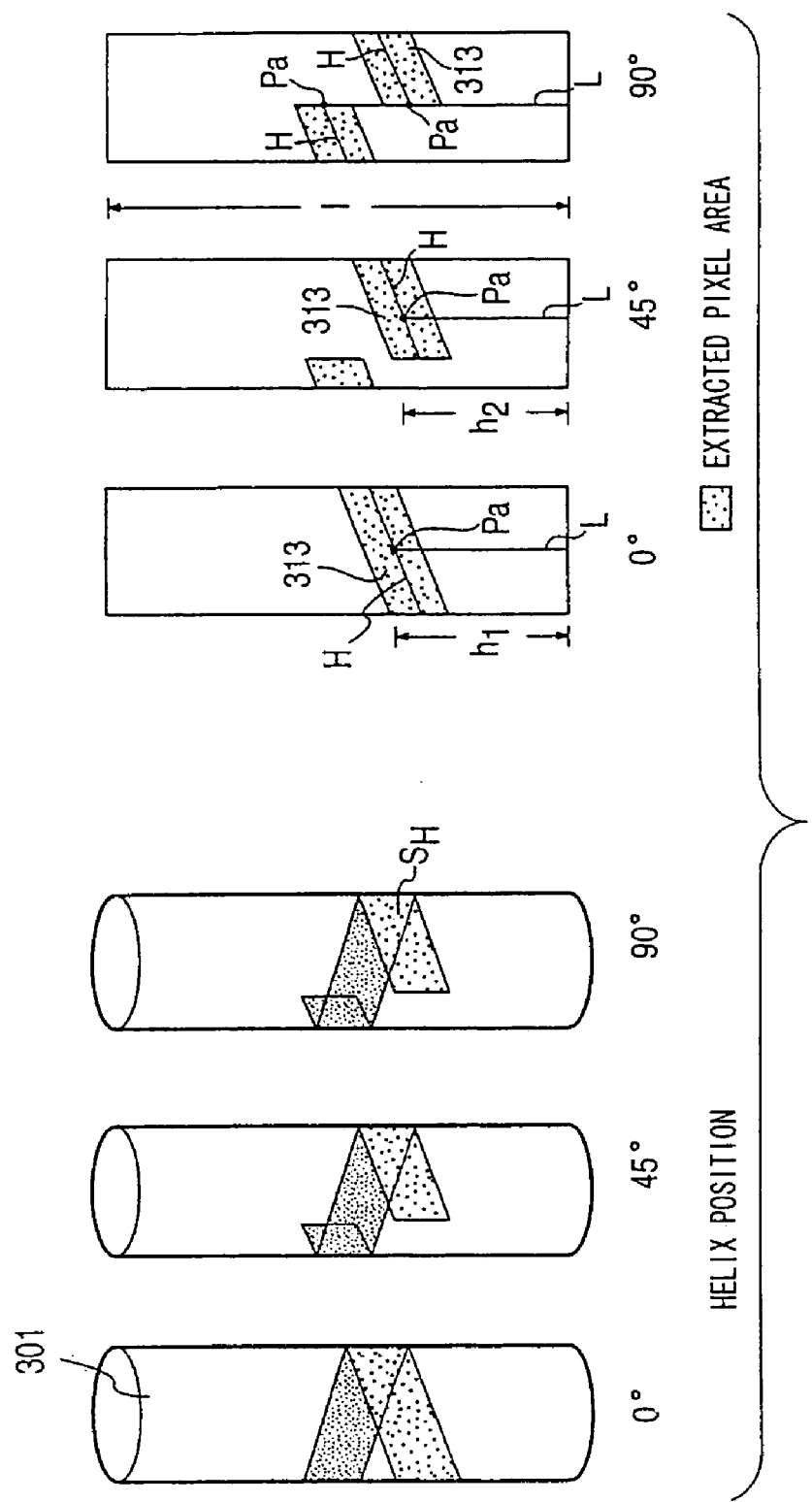
FIG. 7 illustrates a prop device having a helical stripe thereon, and provides a description of principles of another aspect of the present invention whereby a rotational component of the prop can be determined.

More specifically, as shown in FIG. 7, the cylinder 301 (or the cylinder-part of the prop in the case of FIGS. 5A and 5B) includes the single helical strip $S_H$ thereon which goes around the object only once. Information pertaining to the helical stripe is extracted, either from the entire pixel group 313 which makes up the helical stripe or by using the color transitions corresponding to the helical stripe $S_H$, in order to determine, using the geometry processing discussed above, a helix H which best fits to the stripe $S_H$.

In addition to the helix H, a center line l of the pixel group corresponding to the cylinder is determined as described previously. Also the overall length l of the pixel group is determined.

For obtaining a degree of rotation of the cylinder, various heights h (only $h_1$ and $h_2$ are shown for simplicity) each of which define the distance between one end of the cylinder and the point p where the center line intersects the helix are determined.

As shown on the right-hand side of FIG. 7, the camera 190 only sees one side (or orthogonal projection) of the cylinder 301 at a time. Accordingly, the helix H determined from the extracted region of the camera image determines the degree of revolution of the cylinder 301. More specifically, as shown, assuming no rotation (i.e. a rotational component of 0 degrees), a center line extending from one end to a point on the helix will have a first height $h_1$, whereas if the object is rotated by 45 degrees, the height of the center line l between the lower end to the point where it intersects the helix H will have a shorter height $h_2$. The condition shown by the far right-hand side of FIG. 7, at a rotation of 90 degrees, represents to a unique case in which the center line will intersect the helix at two points. Hence, by calculating the heights of the center line l, a component of rotation of the cylinder 301 (or any other object affixed to the cylinder and rotated thereby) can be determined.

The specific quantity used for determining rotation is the ratio of the detected height between the lower end and the point on the helix to the total length l of the pixel group. This ratio gives a number from 0 to k (where $k=h_{max}/l$) which maps directly to a range of from 0 to 360 degrees. Thus, additional information with respect to the object and orientation of the cylinder 301 in three-dimensional space can be provided. Such information can be used to control the rotation of a virtual object, for example, when displayed in a game program.

Figure 8A:
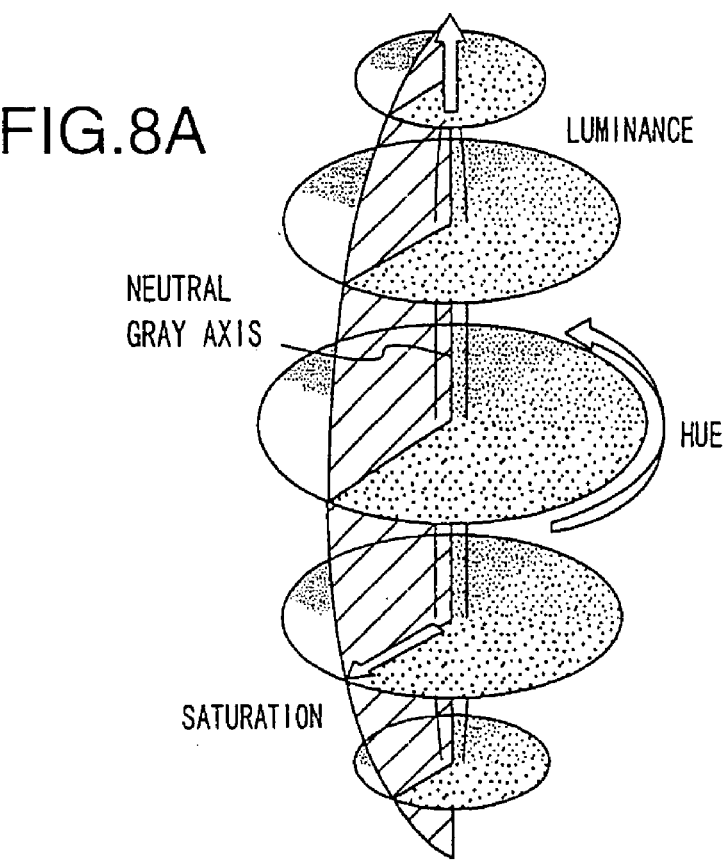
FIGS. 8A and 8B are graphs for describing a two-dimensional chrominance color space, for illustrating principles by which color transitions associated with colored stripes provided on a manipulated object are selected to maximize their detectability.

Next, with respect to FIGS. 8A and 8B, a process for selection of colors for the stripes, according to the embodiments of FIGS. 6A and 6B shall now be described. More specifically, FIG. 8A shows a diagram of a color space defined by luminance and radial coordinates of hue and saturation. Luminance is the brightness or intensity of the color, hue is the shift in the dominant wavelength of a spectral distribution, and saturation is the concentration of a spectral distribution at one wavelength.

Figure 8B:
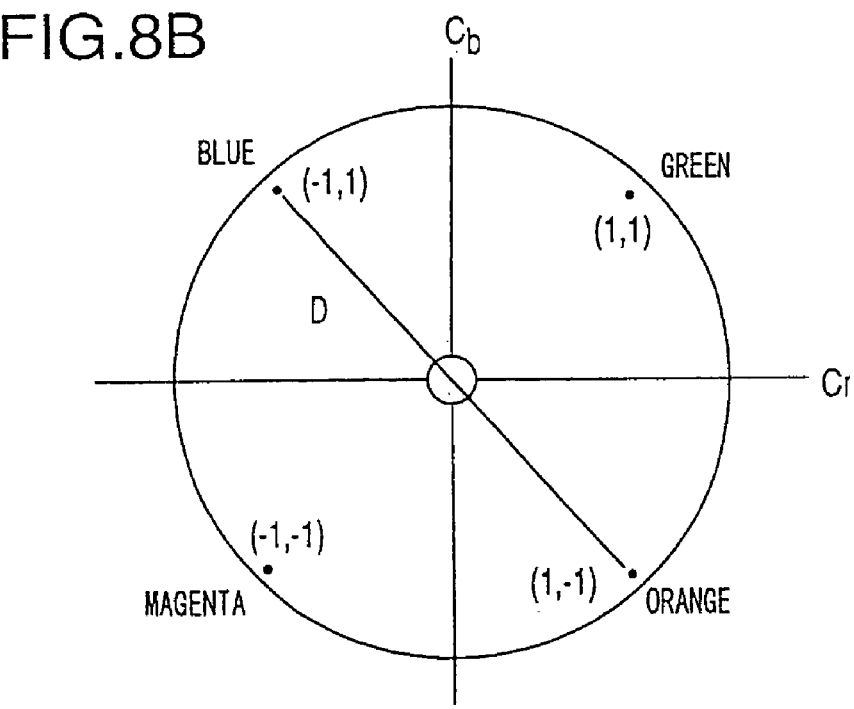

By contrast, FIG. 8B shows a two-dimensional chrominance color space corresponding to the Cr and Cb chrominance output signals of the video camera. It is well understood in the art that video cameras output signals for controlling the color of each pixel making up a video image. As shown by the color wheel diagram of FIG. 8A, color can be defined using radial coordinates corresponding respectively to hue and saturation. However, as it is needlessly complex for computerized image processing to use radial coordinates, another more useful standard for defining color is the YCrCb color definition, which is the most common representation of color used in the video world. YCrCb represents each color by a single luma component (Y) and two components of chrominance Cr and Cb. Y may be loosely related to brightness or luminance whereas Cr and Cb make up a quantities loosely related to hue. These components are defined more rigorously in ITU-R BT.601-4 (Studio encoding parameters of digital television for standard 4:3 and wide-screen 16:9 aspect ratios) published by the International Telecommunication Union. Thus, the Cr and Cb chrominance signals for each pixel are defined by Cartesian coordinates which also can be used to determine a location within the color wheel corresponding to a certain hue and saturation.

According to the present invention, the color of the stripes $S_1$, $S_2$ and $S_3$ and the color of the cylinder 301 are chosen in such a way as to maximize stripe detectability for the video camera. Color-based tracking is notorious for its difficulties due to changes in lighting, which cause the apparent color to vary. As a result, if one is attempting to detect a certain color of blue corresponding to an object, for example, under certain lighting conditions it is possible for the color of blue, as perceived by the camera, to vary to such a degree that accurate detection of the object is made difficult. In the present invention, by looking for color transitions instead of absolute colors, a more robust tracking solution can be attained. For example, in the embodiment of FIGS. 6A and 6B, if the cylinder 301 is blue and the stripes $S_1$, $S_2$ and $S_3$ are orange, if lighting conditions change, then the apparent colors will also change. However, the transition between these colors, as shown in FIG. 6B, will still be very evident.

As discussed above, video cameras capture data using the two-dimensional chrominance color space shown in FIG. 8B. By choosing colors for the object and stripes, respectively, which have a maximal separation D in this space, it is possible to significantly enhance the detectability of the color transitions.

More specifically, as shown in FIG. 8B, highly saturated colors of blue and orange are located at substantially diametrically opposed sides of the color wheel and are separated by a large distance D in the color space. The actual distance D can be calculated as the hypotenuse of a triangle having sides defined by $\Delta Cr$ (i.e. the difference in the Cr chrominance signal values for the two colors of blue and orange) and $\Delta Cb$ (i.e. the difference in the Cb chrominance signal values for the same two colors), and hence the actual distance D is the square root of $(\Delta Cr)^2+(\Delta Cb)^2$, as already discussed above in equation (4).

Although blue and orange have been described as an example, it will be appreciated that any other color pairs, for example green and magenta, which also possess a large separation in the chrominance color space may be used. In other words, the method provides a general criteria whereby colors may be selected using their chrominance signals Cr and Cb in such a manner to maximize their separation in the color space.

More specifically, a generally applicable method for the selection of colors, as well as for calculating distance between any two colors, is performed in such a way that the distance between two colors is calculated as a distance projected onto a certain diameter-spoke of the color wheel. First, a given diameter-spoke on the color wheel is selected having a certain angle of orientation θ. By choosing the angle of orientation of the selected diameter on the color wheel, it is possible to select the color transitions one wants to detect. For example, if green is (1, 1) and magenta is (−1, −1), the diameter of the spoke should be set at an orientation θ of 45 degrees. Then the color separation distance is calculated simply by projecting the colors onto the 45 degree line. In this manner, for the case of green and magenta, the computed distance is exactly the same as the Pythagorean distance D discussed above, however with a diameter-line orientation of 45 degrees, the distance between blue and orange is zero, because they both project to the origin. This tells us that, for a selected diameter line of 45 degrees, green and magenta are the optimal colors for detection, since they possess the maximum separation in the color space for this diameter.

Thus, for any given diameter angle of θ, which can be chosen from 0 to 180 degrees, the separation between two colors $(Cr_1, Cb_1)$ and $(Cr_2, Cb_2)$ may be calculated according to equation (5) as follows:

$$D=[Cr_1 \cdot \cos\theta + Cb_1 \cdot \sin\theta]-[Cr_2 \cdot \cos\theta + Cb_2 \cdot \sin\theta] \quad (5)$$

The distance calculation shown by equation (5) can therefore also be used for setting the threshold $D_t$ based on a predetermined orientation defined by the angle θ. For example, if the color transitions for the object were in fact green and magenta, the general distance calculation above can be used for threshold setting, while fixing the angle θ of this equation at 45 degrees.

Herein have been described several methods for determining the position and orientation of a real object manipulated in front of a video camera, by mapping the two-dimensional image information of the object captured by the camera to a three-dimensional space, wherein a three dimensional description including position and orientation of the object may be used to control action in a game program.

Although one clear example of controlling a game program is to have a "virtual object" that forms a moving image in a game display corresponding to how the "real" object is moved or positioned, it will be appreciated that the three-dimensional information can be used to control game programs in any number of different ways foreseeable to persons skilled in the art. For example, a "theremin" like musical effect can be achieved wherein changes in the position and orientation of the manipulated object could be used to influence volume, tone, pitch, rhythm and so forth of sounds produced by the sound processor. Such a musical or rhythmic sound effect can by provided in combination with visual effects displayed on the screen of the game console, for enhancing the experience perceived by the game player.

It shall be understood that other modifications will be apparent and can be easily made by persons skilled in the art without departing from the scope and spirit of the present invention. Accordingly, the following claims shall not be limited by the descriptions or illustrations set forth herein, but shall be construed to cover with reasonable breadth all features which may be envisioned as equivalents by those skilled in the art.

The invention claimed is:

1. A method for selecting colors to detect color transitions, comprising:
    providing an object having at least two colors for which a color transition is to be detected, a first color of the at least two colors defined by a first chrominance coordinate in a color space and a second color of the at least two colors defined by a second chrominance coordinate in the color space;
    projecting a line from each respective point defined by the first and second chrominance coordinates to a diameter having a given angle of orientation θ on a color wheel defined by the color space, the lines being normal to the diameter;
    calculating a distance D between respective points where the lines intersect the diameter; and
    selecting for detection of color transitions only colors for which the calculated distance D exceeds a predetermined threshold.

2. The method of claim 1 wherein the first coordinate in the color space is $(Cr_1, Cb_1)$.

3. The method of claim 1 wherein the second coordinate in the color space is $(Cr_2, Cb_2)$.

4. The method of claim 1 further comprising detecting the at least two colors with a camera device.

5. The method of claim 1 wherein the color space comprises a two-dimensional color space.

6. The method of claim 1 wherein the distance D is calculated according to the equation $D=[Cr_1 \cdot \cos\theta + Cb_1 \cdot \sin\theta]-[Cr_2 \cdot \cos\theta + Cb_2 \cdot \sin\theta]$.

7. The method of claim 1 wherein the distance D is calculated according to the equation $D=[(\Delta Cr)^2+(\Delta Cb)^2]^{1/2}$.

8. The method of claim 1 wherein the at least two colors have a large separation in the color space.

9. The method of claim 1 further comprising selecting the diameter having the given angle of orientation θ.

10. A method for identifying color pixels in a video image comprising:
    tracking an object of interest against a background, wherein the object of interest has a first color and the background has a second color;
    detecting the first and second color, wherein each color is represented as a respective color chrominance coordinate in a color wheel in a color space;
    projecting a line from each respective point defined by the first and second chrominance coordinates to a diameter having a given angle of orientation θ on the color wheel defined by the color space, the lines being normal to the diameter;
    calculating a distance D between respective points where the lines intersect the diameter; and
    identifying those pixels wherein the calculated distance D exceeds a predetermined threshold.

11. The method of claim 10 further comprising identifying the object of interest in the video image, the object being comprised of pixels.

12. The method of claim 10 further comprising selecting the diameter having the given angle of orientation θ.

13. The method of claim 10 wherein the background is multi-colored.

14. The method of claim 10 wherein the background is non-static.

15. The method of claim 10 further comprising deriving a description of three-dimensional position of the object of interest wherein deriving the description is a result of identifying a pixel.

16. The method of claim 10 wherein the distance D is calculated according to the equation $D=[Cr_1 \cdot \cos \theta + Cb_1 \cdot \sin \theta] - [Cr_2 \cdot \cos \theta + Cb_2 \cdot \sin \theta]$.

17. A computer-readable medium encoded with a computer program and executable by a computer comprising:
    tracking an object of interest against a background, wherein the object of interest has a first color and the background has a second color;
    detecting the first and second color, wherein each color is represented as a respective color chrominance coordinate in a color wheel in a color space;
    projecting a line from each respective point defined by the first and second chrominance coordinates to a diameter having a given angle of orientation $\theta$ on the color wheel defined by the color space, the lines being normal to the diameter;
    calculating a distance D between respective points where the lines intersect the diameter; and
    identifying those pixels wherein the calculated distance D exceeds a predetermined threshold.

18. The computer-readable medium of claim 17 wherein the method further comprises identifying the object of interest in the video image, the object being comprised of pixels.

19. The computer-readable medium of claim 17 wherein the method further comprises deriving a description of three-dimensional position of the object of interest wherein deriving the description is a result of identifying a pixel.

20. The computer-readable medium of claim 17 wherein the distance D is calculated according to the equation $D=[Cr_1 \cdot \cos \theta + Cb_1 \cdot \sin \theta] - [Cr_2 \cdot \cos \theta + Cb_2 \cdot \sin \theta]$.

* * * * *

UNITED STATES PATENT AND TRADEMARK OFFICE
CERTIFICATE OF CORRECTION

| | | |
|---|---|---|
| PATENT NO. | : 7,113,193 B2 | Page 1 of 1 |
| APPLICATION NO. | : 10/927918 | |
| DATED | : September 26, 2006 | |
| INVENTOR(S) | : Richard L. Marks | |

It is certified that error appears in the above-identified patent and that said Letters Patent is hereby corrected as shown below:

\* On the Title page of the patent at Item (62):

"Division of application No. 09/261,578, filed on Jul. 21, 2000, now Pat. No. 6,795,068" should be corrected to read --Division of application No. 09/621,578, filed Jul. 21, 2000, now Pat. No. 6,795,068.--

\* At col. 15, Line 1-2 (in the preamble of claim 17):

"and executable by a computer comprising" should be corrected to read --and executable by a computer to perform a method for identifying color pixels in a video image comprising:--

Signed and Sealed this

Tenth Day of April, 2007

JON W. DUDAS
*Director of the United States Patent and Trademark Office*